United States Patent
Cote

(10) Patent No.: US 8,739,901 B2
(45) Date of Patent: Jun. 3, 2014

(54) WELLBORE PERCUSSION ADAPTER AND TUBULAR CONNECTION

(75) Inventor: Bradley R. Cote, Calgary (CA)

(73) Assignee: Nov Worldwide C.V. (NL)

( * ) Notice: Subject to any disclaimer, the term of this patent is extended or adjusted under 35 U.S.C. 154(b) by 500 days.

(21) Appl. No.: 12/878,551

(22) Filed: Sep. 9, 2010

(65) Prior Publication Data

US 2011/0031020 A1 Feb. 10, 2011

Related U.S. Application Data

(63) Continuation-in-part of application No. PCT/CA2009/000313, filed on Mar. 13, 2009.

(60) Provisional application No. 61/036,328, filed on Mar. 13, 2008, provisional application No. 61/076,050, filed on Jun. 26, 2008, provisional application No. 61/138,017, filed on Dec. 16, 2008, provisional application No. 61/266,462, filed on Dec. 3, 2009.

(51) Int. Cl.
*E21B 10/36* (2006.01)
*E21B 4/14* (2006.01)

(52) U.S. Cl.
USPC .............................. 175/296; 175/57; 175/107

(58) Field of Classification Search
USPC ............................................ 175/107, 57, 296
See application file for complete search history.

(56) References Cited

U.S. PATENT DOCUMENTS

| | | | |
|---|---|---|---|
| 1,613,555 A | 1/1927 | Boyd | |
| 1,801,673 A * | 4/1931 | Knox ............................ | 175/302 |
| 2,554,005 A | 5/1951 | Bodine, Jr. | |
| 2,641,445 A * | 6/1953 | Snyder ............................ | 175/93 |
| 2,717,763 A | 9/1955 | Bodine, Jr. | |
| 3,807,512 A | 4/1974 | Pogonowski et al. | |
| 4,564,225 A | 1/1986 | Taylor | |
| 4,867,250 A | 9/1989 | Ono | |
| 5,307,886 A | 5/1994 | Hopper | |
| 5,474,334 A | 12/1995 | Eppink | |
| 5,662,180 A * | 9/1997 | Coffman et al. ................ | 175/57 |
| 5,794,985 A | 8/1998 | Mallis | |
| 6,761,231 B1 | 7/2004 | Dock et al. | |
| 7,011,156 B2 | 3/2006 | von Gynz-Rekowski | |
| 2001/0054515 A1* | 12/2001 | Eddison et al. ................. | 175/56 |
| 2005/0126822 A1* | 6/2005 | Campbell et al. ............... | 175/57 |
| 2006/0278433 A1* | 12/2006 | Walker et al. ................... | 175/57 |

FOREIGN PATENT DOCUMENTS

| | | |
|---|---|---|
| CA | 2394937 | 1/2004 |
| DE | 3207183 C1 | 6/1983 |
| GB | 191310139 | 0/1914 |
| GB | 181194 | 6/1922 |
| GB | 2357325 A | 6/2001 |
| RU | 2148144 C1 | 4/2000 |
| WO | WO 2009/111887 | 9/2009 |

* cited by examiner

*Primary Examiner* — Thomas Beach
*Assistant Examiner* — Catherine Loikith
(74) *Attorney, Agent, or Firm* — Conley Rose, P.C.

(57) ABSTRACT

A percussion adapter that is driven to generate a percussive axial motion on a wellbore structure. One percussion adapter includes a drive connection to mechanically convert rotational drive to axially directed percussive motion. Another percussion adapter employs a valve that creates back pressure causing axially directed percussive motion. A wellbore tubular connection transitions torque to resist back off when left hand or right hand torque is applied.

12 Claims, 6 Drawing Sheets

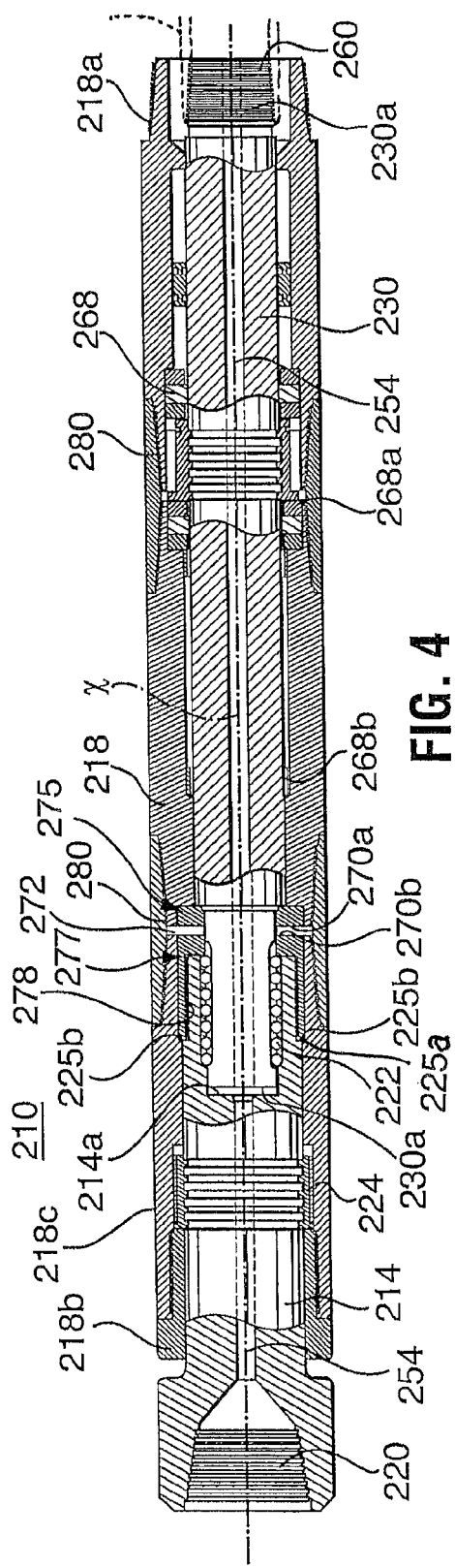
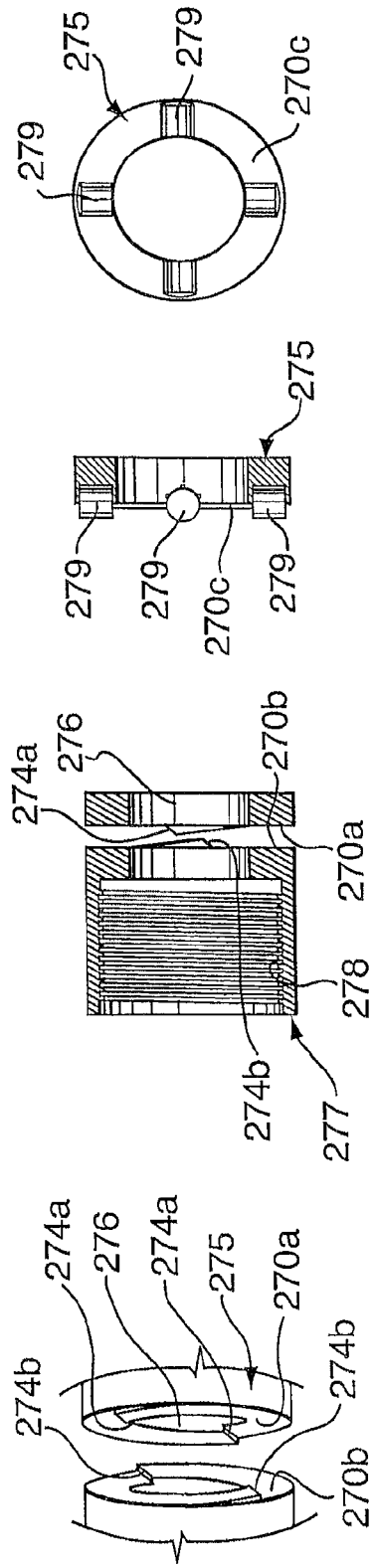
FIG. 4A
FIG. 4B
FIG. 4C
FIG. 4D
FIG. 4

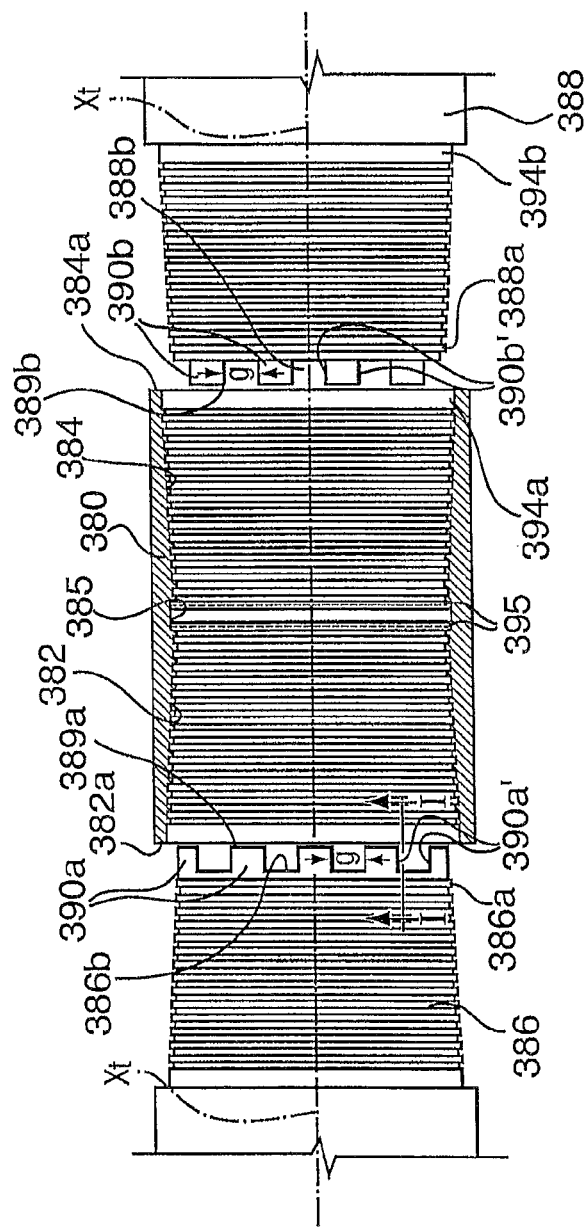
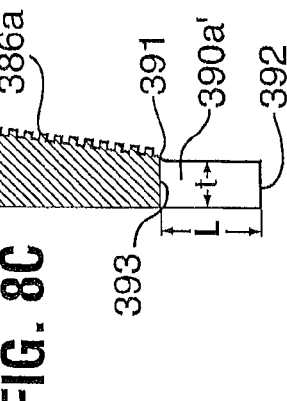
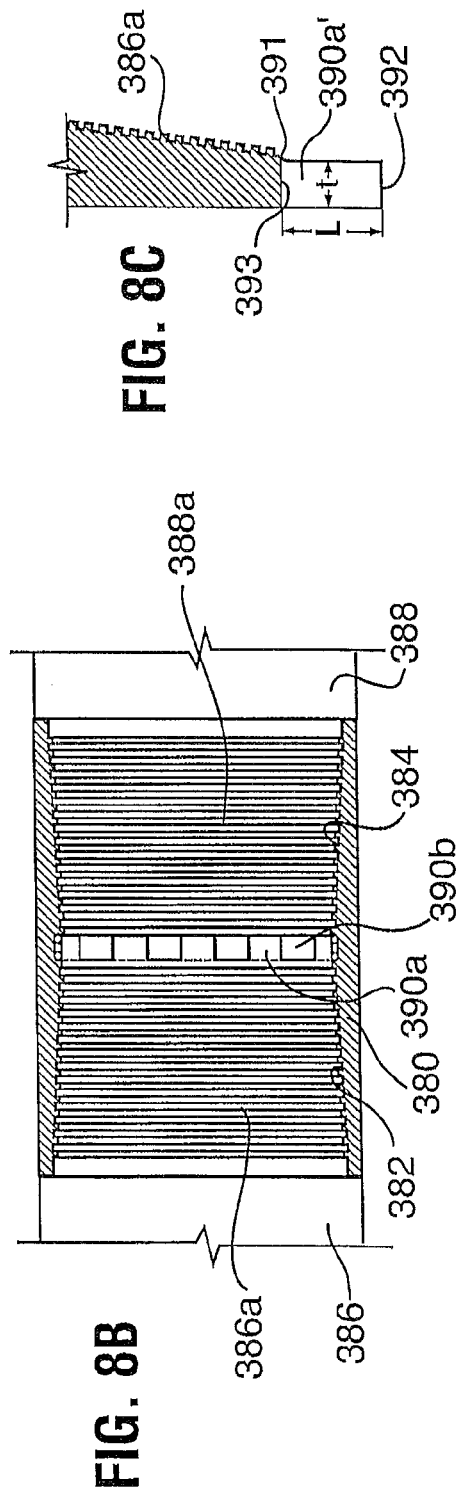
FIG. 8A
FIG. 8C
FIG. 8B

WELLBORE PERCUSSION ADAPTER AND TUBULAR CONNECTION

CROSS REFERENCE TO RELATED APPLICATIONS

This application is a continuation-in-part of PCT application no. PCT/CA2009/000313 filed Mar. 13, 2009 which claims priority from U.S. provisional application Ser. No. 61/036,328 filed Mar. 13, 2008; U.S. provisional application Ser. No. 61/076,050 filed Jun. 26, 2008 and U.S. provisional application Ser. No. 61/138,017 filed Dec. 16, 2008. This application also claims priority from U.S. Provisional application Ser. No. 61/266,462 filed Dec. 3, 2009.

FIELD

The present invention relates to down hole tools and, in particular, a wellbore percussion adapter for applying an axially directed percussive effect to wellbore structure and a tubular connection.

BACKGROUND

The application of a percussive force to a wellbore structure may be of interest. For example, if one could add a percussive force to the drill bit while drilling a wellbore, it is believed that the rate of drilling penetration could be significantly increased, the required weight on bit could be significantly reduced and torque required to turn the drill bit could be significantly reduced. A "percussionized" drill bit should be an efficient drilling tool.

Many previous attempts at developing percussion adapters have focused on hydraulically driven devices. These devices use the flow of drilling fluid to drive pistons with a percussion adapter to create an axially directed percussive effect at the drill bit.

A common problem experienced in down hole operations relates to the effect of torque on tubular connections. This problem may be exaggerated when torque is generated in the operation of a tool down hole.

SUMMARY

In accordance with a broad aspect of the present invention, there is provided a method for accelerating the drilling penetration of a rotary driven drill bit, the method comprising: providing a positive displacement motor including a motor housing, a fluid discharge and a rotor powered by fluid pressure; providing a drill bit; providing a drilling accelerator including a housing and a drive connection to mechanically convert rotational drive to axially directed percussive motion; connecting the drilling accelerator below the motor including connecting the housing to move with the motor housing, connecting the drive connection to be driven rotationally by the rotor and bringing the fluid passage into communication with the fluid discharge; connecting the drill bit below the drilling accelerator with the drive connection in drive communication with the drill bit; pumping fluid through the motor to drive the rotor and the drive connection to rotate and to generate axial percussive motion which is communicated from the drive connection to the drill bit and; discharging fluid from the fluid discharge to pass through the drilling accelerator and the drill bit.

In accordance with another broad aspect of the present invention, there is provided a drilling accelerator comprising: a housing including an upper end and a lower end; a drive connection including an upper axially rotatable drive shaft for receiving an input of rotational motion, a rotational to axial mechanical drive converter in communication with the upper axially rotatable drive shaft for converting the input of rotational motion to an axial sliding motion; a lower longitudinally moveable drive shaft in communication with the rotational to axial mechanical drive converter to receive the axial sliding motion from the rotational to axial mechanical drive converter and a lower drill bit installation site connected to the lower longitudinally moveable drive shaft for receiving the axial sliding motion and capable of conveying axial percussive motion there through, the lower drill bit installation site telescopically mounted adjacent the lower end of the housing and slidably moveable relative thereto.

In accordance with another broad aspect of the present invention, there is provided a method for applying an axially directed percussive force to a wellbore structure, the method comprising: running into a wellbore with a string including (i) a positive displacement motor including a motor housing, a fluid discharge and a rotor powered by fluid pressure; (ii) a percussion adapter including a housing and a drive connection to mechanically convert rotational drive to axially directed percussive motion; and (iii) a wellbore structure, the percussion adapter being connected below the motor such that the housing moves with the motor housing, the drive connection is driven rotationally by the rotor and the fluid passage is in communication with the fluid discharge and the wellbore structure being connected below the percussion adapter with the drive connection in drive communication with the wellbore structure; pumping fluid through the motor to drive the rotor and the drive connection to rotate and to generate axial percussive motion which is communicated from the drive connection to the wellbore structure and; discharging fluid from the fluid discharge to pass through the percussion adapter toward the wellbore structure.

In accordance with another broad aspect of the present invention, there is provided a percussion adapter comprising: a housing including an upper end and a lower end; a drive connection including an upper axially rotatable drive shaft for receiving an input of rotational motion, a rotational to axial mechanical drive converter in communication with the upper axially rotatable drive shaft for converting the input of rotational motion to an axial sliding motion; a lower longitudinally moveable drive shaft in communication with the rotational to axial mechanical drive converter to receive the axial sliding motion from the rotational to axial mechanical drive converter and a base end of the lower longitudinally moveable drive shaft for receiving the axial sliding motion and capable of conveying axial percussive motion there through, the base end mounted adjacent the lower end of the housing and slidably moveable relative thereto.

In accordance with another broad aspect of the present invention, there is provided a percussion adapter comprising: an upper housing; a fluid flow channel extending from the upper end to the lower end of the upper housing, the first fluid flow channel including a fluid entry end opening adjacent the upper end and a fluid exit adjacent the lower end; a lower housing telescopically installed for axially sliding motion relative to the lower end of the upper housing; a second fluid flow channel extending from an inlet end open at the upper end to a discharge end opening at the lower end of the lower housing, the inlet end being in fluid communication with the outlet end of the first fluid flow channel; an axial drive generator operable to create a force to drive the upper housing axially away from the lower housing such that the upper housing can be forced down against the lower housing to create a hammering effect against the lower housing.

In accordance with a broad aspect of the present invention, there is provided a method for applying a vibratory force to a downhole string, the method comprising: providing a wellbore string with a percussion adapter installed therein, a fluid supply to the percussion adapter and a drill bit installed below the percussion adapter; positioning the bottom hole assembly relative to a formation to drill a wellbore; pumping fluid through the percussion adapter to generate axial percussive motion by a driver causing an upper housing of the percussion adapter to lift away from and drop down on a lower portion of the percussion adapter, the axial percussive force being communicated to the wellbore string to create a vibration therein and; discharging fluid from the percussion adapter to continue to pass through the wellbore string.

In accordance with another broad aspect of the present invention there is provided a wellbore string tubular connection comprising: a first tubular including a first threaded pin end with a right hand thread form and a protrusion extending from its pin end face to create a stepped region thereon, a second tubular including a second threaded pin end with a left hand thread form and a recess on its pin end face forming a shoulder sized to accept the stepped region of the first pin end seated thereagainst, and a collar including a first threaded box with a first selected thread form selected to threadedly engage the right hand thread form of the first threaded pin end and a second threaded box with a second thread form selected to threadedly engage the left hand thread form of the second threaded pin end.

In accordance with a broad aspect of another invention, there is provided a method for making up a wellbore connection, the method comprising: providing a first wellbore tubular with a threaded pin end and an tooth extending from a pin end face thereof, a second tubular with a threaded pin end and recess in a pin end face thereof, the recess sized to accept the tooth of the first wellbore tubular and a collar including a first threaded box end and an opposite threaded box end; aligning the first wellbore tubular and the second wellbore tubular to be threaded into the box ends of the collar and with the tooth aligned with the recess and rotating the collar about its long axis to engage the threaded pin ends of the first wellbore tubular and the second wellbore tubular and draw the threaded pin ends into the collar.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein:

FIG. 4 is an axial sectional view along another drilling accelerator.

FIG. 4A is perspective view of a cam-type drive converter useful in the present invention.

FIG. 4B is an axial section through a cam-type converter useful in the present invention.

FIG. 4C is an axial section through a roller-type cam insert useful in the present invention.

FIG. 4D is a front elevation of the insert of FIG. 4C.

FIG. 8A is an exploded, axial section through a tubular connection useful in the present invention.

FIG. 8B is an assembled, axial section through a tubular connection useful in the present invention.

FIG. 8C is a section along line I-I of a pin end of FIG. 8A.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

A percussive adapter can be installed and operated to apply a percussive force to a downhole structure such as a drill bit, a liner, etc. When used for drilling purposes, percussive adapters are sometimes alternately called drilling accelerators, drilling hammers, and fluid hammers. A drilling accelerator can be installed in a drill string to facilitate wellbore drilling operations. A drilling accelerator creates a percussive effect applied to the drill bit that alone or with rotary drive of the bit causes the drill bit to drill into a formation.

Figure 1:
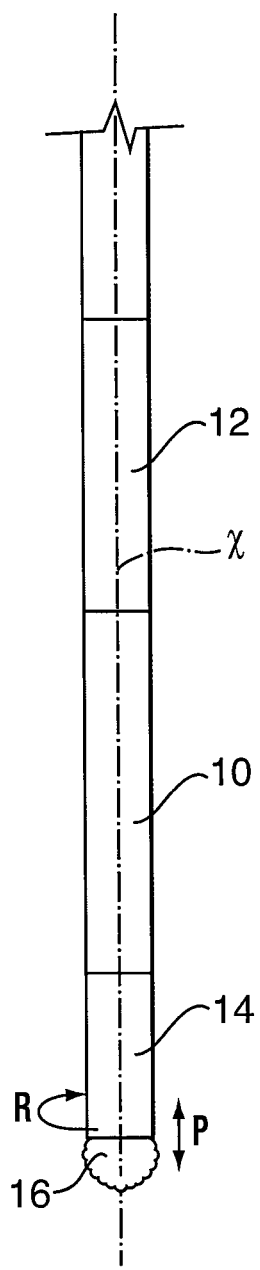
FIG. 1 is a schematic sectional view along a portion of a drill string.

With reference to FIG. 1, the lower end of a drill string is shown. A drilling accelerator 10 can include a drive converter connection that accepts rotational drive about axis x from a torque generating device 12 above and converts that rotational drive to an axially directed percussive force that is output to a bit box sub 14 positioned below the drilling accelerator. When such a drill string is in use with a drill bit 16 installed in the bit box and the drill bit being rotationally driven, arrow R, the axially directed percussive force, arrow P, applied to the bit box sub is conveyed to the drill bit and can facilitate drilling at the drill bit.

Figure 2:
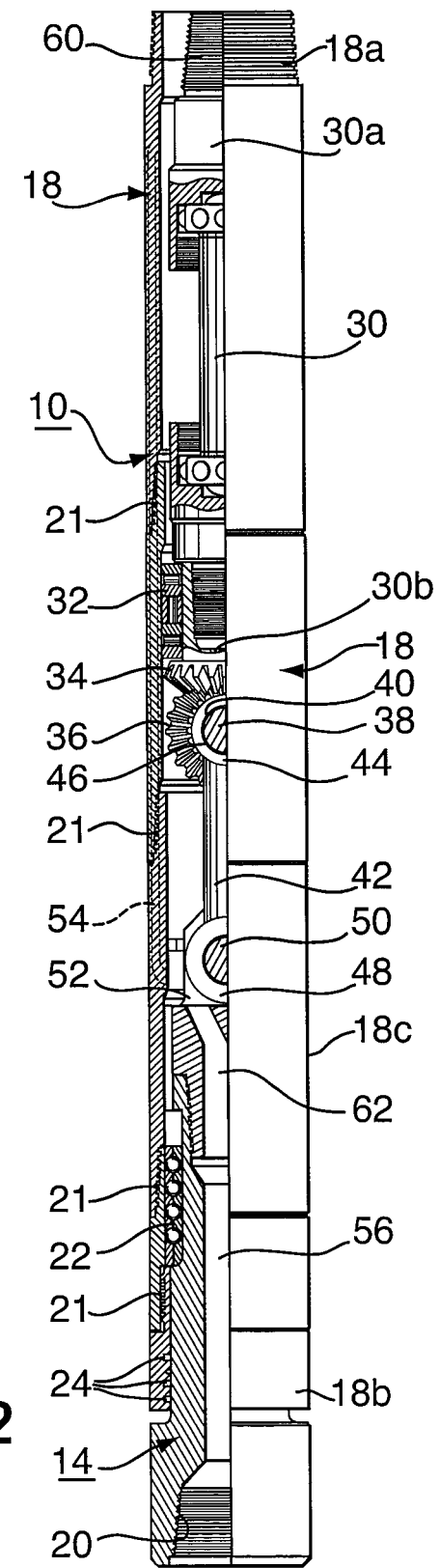
FIG. 2 is an axial sectional view along one embodiment of a drilling accelerator.

One embodiment of drilling accelerator 10 is shown in FIG. 2. Drilling accelerator 10 may include an outer housing 18 including an upper end 18a and a lower end 18b. Outer housing 18 is rugged, being exposed on its external surface 18c to the wellbore annulus and houses therewithin the drive components for generating a percussive force.

To facilitate construction of the drilling accelerator, as will be appreciated, the housing can be formed in sections and connected together by various means such as by welding, interlocks or threaded engagement, as shown at connections 21.

Upper end 18a of the housing is formed for connection into a drill string, such as by forming as a threaded connection. Lower end 18b of the housing is formed for connection, shown herein directly but may be indirect, to a bit box sub 14.

Bit box sub 14 has formed therein a site, such as, for example, threaded bit box 20, for accepting connection of a drill bit.

Bit box sub 14 is connected for rotational movement with housing 18 through a splined connection 22. However, connection 22 permits axial sliding motion of the bit box sub within housing 18, such axial sliding motion being generated by a connection to the drive connection of drilling accelerator 10. The drive connection is intended to drive the bit box sub axially to apply a percussive force at any drill bit connected into the bit box during drilling. Seals may be provided, such as O-rings and wiper seals 24 to resist fluid passage between the housing and the bit box sub, etc.

In one embodiment, the drive connection includes an axial shaft 30 supported in bearings 32 to convey rotational drive from an input end 30a to an output end 30b which carries a bevel gear 34. This bevel gear 34 meshes with a second bevel gear 36 mounted on transverse shaft 38 which is rotatably supported in the housing. Transverse shaft 38 includes an eccentric 40 thereon which drives a drive shaft 42. Drive shaft 42 includes a strap 44 with a bearing 46 therein in which eccentric 40 rotates. Drive shaft 42 at its opposite end includes an eye 48 through which the drive shaft is pinned via pin 50 to a percussion adapter 52 secured to bit box sub 14 for a drill bit.

Rotation in shaft 30 through reduction gears 34, 36 will impart on the percussive adapter 52 an axially directed reciprocation determined by the throw of eccentric 40. This axially directed reciprocation is then conveyed directly to any bit secured in the bit box 20 of the bit box sub.

The input torque may be generated by a mud motor. For example, axial shaft 30 may be connected to a rotor of a mud motor such that any rotation of the rotor, by flow of drilling fluid through the motor, may be conveyed to the drive connection. In one embodiment, the mud motor may include a positive displacement-type motor (PDM), which uses pressure and flow of the drilling fluid to turn a rotor within a stator. Shaft 30 can be connected directly or indirectly to the rotor, as through threaded connection 60. Where a bent sub is positioned between the motor and the drilling accelerator, a universal connector may be positioned therebetween to convey rotation from the rotor to the axial shaft.

The fluid that drives the motor can continue down through the accelerator and to the bit. As such, the accelerator may include drilling fluid passages 54 that can be connected in communication with the motor discharge and that extends from end 18a, about the drive connection components, to passages 62 through adapter 52 into a bore 56 of bit box sub 14. Passages 54 may be formed, as by milling, etc. through outer housing 18 and can be directed by ports, seals, etc. from the discharge of the pump to passages 62 into the inner bore of the bit box. In some embodiments, outer housing 18 may require thickening or laminate/telescopic construction to accommodate the passages.

Gears 34, 36 and other moving parts may be grease packed for lubrication thereof. A compensator may be provided, for example, in end 30a to accommodate or alleviate pressure differentials which may occur during down hole operations.

The embodiment of FIG. 2 operates to drill a borehole by applying a percussive force through the drill bit to the formation, with or without rotating the drill string from surface. In another embodiment shown in FIG. 3, the drilling accelerator may include a drive system for conveying rotational drive from the motor to the drill bit in addition to the percussive forces generated thereby.

Figures 3, 3A:
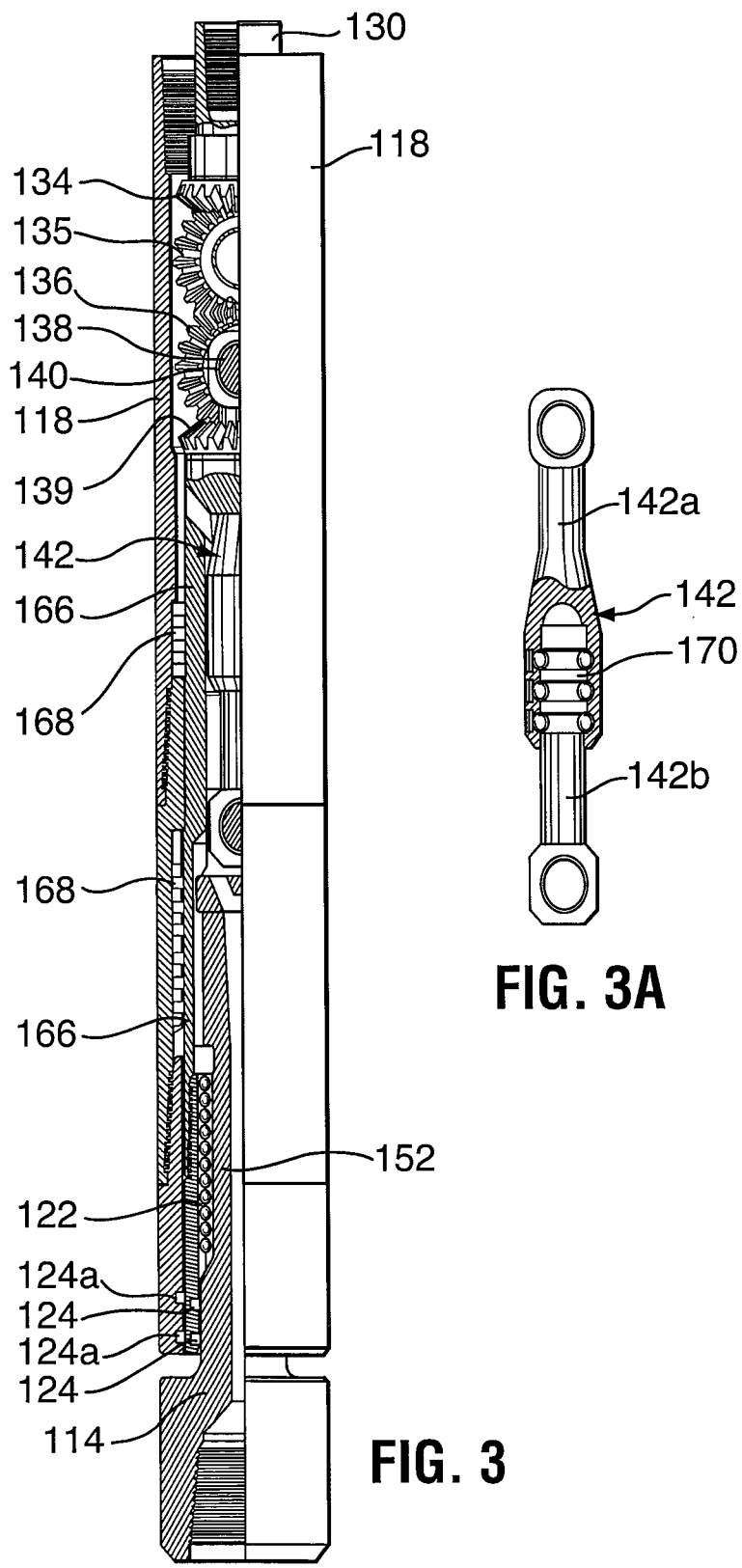
FIG. 3 is an axial sectional view along another drilling accelerator.
FIG. 3A is an elevation, partly in section, of a drive shaft useful in a drilling accelerator.

Referring, therefore to FIG. 3, a drilling accelerator is shown including an outer housing 118 including a lower end 118b, an axial shaft 130 (shown in part) to convey rotational drive from an input to a gear transmission, a shaft 138 including an eccentric 140 for driving a drive shaft 142 and a percussion adapter 152 formed integral with a bit box sub 114 for a drill bit.

In this embodiment, the gear transmission includes gears to convey both rotational and axially reciprocal motion to the bit box sub. As illustrated, for example, gear transmission includes a first gear 135 that accepts input from bevel gear 134 and meshes with a gear 136 that drives shaft 138. Gear 136 also meshes with a second bevel gear 139 that drives the rotation of an inner housing 166. Inner housing 166 extends and rotates within outer housing 118. Inner housing 166 is connected at its lower end for rotational transmission to bit box sub 114. In particular, as shown, bit box sub 114 is connected for rotational movement with housing 166 through a splined connection 122 such that any bit installed in the bit box can be driven to rotate by rotation conveyed from shaft 130.

Connection 122 also permits axial sliding motion of the bit box sub within housing 166, such axial sliding motion being generated by a connection to shaft 138 of the drilling accelerator, the shaft intended to drive the bit box sub axially to apply a percussive force at any drill bit connected into the bit box during drilling, while gear 139 and housing 166 drive rotation of the bit box sub. Seals may be provided, such as O-rings and wiper seals 124 to resist fluid passage between the housing and the bit box sub, etc. Outer housing 118 can extend down to protect the inner housing. Bearings 168 and seals 124a may be provided to facilitate rotation and seal against fluid and debris migration between the parts.

In this embodiment, drive shaft 142 experiences differential rotation therealong: where upper portion 142a is not rotatably driven, but lower portion 142b is pinned to percussion adapter and is rotatably driven. In order to accommodate differential rotation along shaft 142, a bearing 170 can be provided along its length. Bearing 170 allows rotational motion therein of part 142b about its long axis relative to part 142a, but resists axial sliding motion such that axial percussive movement generated by the throw of eccentric 140 is conveyed along the shaft rather than being absorbed.

The input torque may be generated by a mud motor. For example, axial shaft 130 may be connected to a rotor of a mud motor such that any rotation of the rotor, by flow of drilling fluid through the motor, may be conveyed to the drive connection.

It is to be understood that a cam and cam follower can be used to replace an eccentric and connected drive shaft (i.e. items 40, 42 of FIG. 2). When using cams, it may be useful to use weight on bit to maintain the contact between the cam parts.

For example, as shown in FIG. 4, another drilling accelerator 210 may include an outer housing 218 including an upper end 218a and a lower end 218b. Outer housing 218 is rugged, being exposed on its external surface 218c to the wellbore annulus and houses therewithin the drive components for generating a percussive force to be applied to a bit connected therebelow.

To facilitate construction of the drilling accelerator, as will be appreciated, the housing can be formed in sections and connected together by various means such as by welding, interlocks or threaded connections 280.

Upper end 218a of the housing is formed for connection at the distal end of a drill string. Lower end 218b of the housing accommodates a bit box sub 214, which telescopically extends from lower end 218b.

Bit box sub 214 has formed therein a site, such as, for example, threaded bit box 220, for accepting connection of a drill bit (not shown). A bushing and safety catch 224 acts between housing 218 and sub 214 to allow rotation of the sub within the housing and may secure the sub against fully passing out of the housing lower end 218b. Safety catch 224 allows some axial sliding motion of sub 214 within the housing, such axial motion, for example, resulting from moving the sub between a lower position (as shown) and an upper, weight on bit position and being that as a result of the percussive force. In one embodiment, safety catch 224 may be eliminated with the safety provisions thereof instead taken up entirely by interacting shoulders 225a, 225b on the parts. This allows housing end 218b to be thicker along its length.

Bit box sub 214 is connected to an axial shaft 230, the combination of sub 214 and shaft 230 acting to transmit drive energy from an input end 230a of the shaft to a drill bit installed in box 220. Bit box sub 214 and axial shaft 230 may be connected by a telescoping splined connection 222 that ensures continuous rotational drive conveyance while permitting axial sliding motion of the bit box sub relative to shaft 230. Splined connection 222 may include a lubricating chamber that lubricates interaction between the shaft and the sub. Clearances in the splined connection may control the movement of lubricating fluid at the splined connection. As such, by selection of the tolerances at the splined connection, a shock absorbing feature may be provided which controls the speed at which the parts can slide axially at the connection. For example, this may control the speed at which the parts can come together.

The input torque applied to end 230 may be generated by a mud motor. For example, axial shaft 230 may be connected to a rotor 208 of a mud motor such that any rotation of the rotor, as by flow of drilling fluid through the motor, may be conveyed to the bit box sub. In one embodiment, the mud motor may include a positive displacement-type motor (PDM), which uses pressure and flow of the drilling fluid to turn a rotor within a stator. As will be appreciated, drilling fluid may be a liquid, gas, or a combination thereof.

Shaft 230 can be connected directly or indirectly to the rotor, as through threaded connection 260. Where a bent sub is positioned between the motor and the drilling accelerator, a universal connector may be positioned therebetween to convey rotation from the rotor to the axial shaft.

The fluid that drives the motor can continue down through the axial shaft and sub 214 and to the bit. As such, these parts may include drilling fluid passages such as axial bores 254 passing therethrough that can be connected in communication with the motor discharge.

Bearings 268, 268a and bushings 268b may be positioned between the axial shaft and the housing to accommodate radial and on bottom and off bottom thrust loads. A safety catch may also be provided between these parts.

Drilling accelerator 210 further includes a drive converter intended to convert the rotational drive from the motor to an axial, reciprocating motion to drive the bit box sub axially to apply a percussive force at any drill bit connected into the bit box during drilling.

In the illustrated embodiment, the drive converter includes a pair of cam surfaces 270a, 270b. The first cam surface 270a is installed in the housing and the second cam surface 270b is installed to move with bit box sub 214. Cam surfaces 270a, 270b are positioned to be separated by a gap 272 when the bit box is in its lower position, as shown, but can come together when weight is placed on bit. In other words, gap 272 closes when bit box sub is moved into its upper, weight on bit position. Because the housing and shaft/bit box sub 230/214 rotate at different speeds, the cam surfaces act to ride over each other. Generally, rotation of sub 214 within and at a faster rate than any rotation of the housing causes cam surface 270b to ride over cam surface 270a and cam surface 270a effectively becomes the cam follower. Cam surfaces 270a, 270b include one or more cam protrusions 274a, 274b that are oriented and configured to act with consideration of the direction of relative rotation therebetween such that the cam surfaces ride up over each other and drop down thereby generating an axial percussive force to be applied to the bit box sub 214. Cam protrusions 274a, 274b have a ramped approach side, a peak and an exit side. The ramped approach side inclines upwardly to allow the cam protrusions to ride easily up over each other toward the peak. The exit side of the protrusions can be ramped down away from the peak, but a more significant percussive effect may be provided by forming the exit side as shown with an abrupt height change forming a drop off such that the forces (i.e. weight on bit) that drive the cam surfaces together force the parts to abruptly close any gap between them, the gap formed when the protrusions exit off each other. The gap closing develops an abrupt, hammering vibration as the surfaces again come together. While one or more cam protrusions can be provided, it may be useful to position the cam protrusions in a balanced fashion about surfaces 270a, 270b, for example, by positioning the protrusions each equally spaced about the circumference of the cam surface such that all protrusions are on the approach side at the same time. As shown, for example, protrusions 274a, 274b can be in pairs on each surface with a first protrusion of the pair diametrically opposed from the second protrusion of the pair on their cam surface. This may reduce adverse lateral forces in the accelerator.

Cam surfaces 270a, 270b may be formed from materials that accommodate considerable wear without rapid break down.

In another embodiment, one or both of the cam surfaces may be include bearings to facilitate movement of the surfaces over one another and reduce detrimental wear to increase tool longevity. For example, in one embodiment, as shown in FIGS. 4C and 4D, the cam protrusions on one of the cam surfaces, for example, surface 270a of FIG. 4 may be replaced by a cam insert 275a carrying rollers 279 on the cam surface 270c. Rollers 279 are installed to ride up over the cam protrusions 274b of the opposite surface (i.e. surface 270b) and drop down the exit side of the protrusions to create a vibratory effect. In one embodiment, the rollers may be ball bearing type rollers carried in the selected cam surface. Alternately, the rollers may be cylindrical rollers, as shown, or conical type rollers held to rotate along an axis extending radially from the tool long axis $\chi$.

Rotation in shaft 230 and bit box sub 214 relative to housing 218 will impart on sub 214 axially directed reciprocation determined by the throw of cam protrusions 274a, 274b of surfaces 270a, 270b. This axially directed reciprocation is then conveyed as a vibratory effect to any bit secured in, directly or indirectly, the bit box 220 of the bit box sub.

The vibratory effect may be created by axially reciprocating movement created at the interacting cam surfaces which causes a hammering effect when the two parts impact against one another. However, in one embodiment, the tool may be selected to create the vibratory effect by first generating axially reciprocating movement at the interacting cam surfaces that in turn cause a hammering effect at surfaces apart from the cam surfaces. In such an embodiment, the form of the cam surfaces may be preserved by reducing the detrimental wear caused by the parts striking against one another. In particular, while the reciprocating action is generated at the cam surfaces, the impact creating the hammering effect is generated elsewhere. Such an embodiment may be provided, for example, by provision of a two part mandrel, as provided by axial shaft 230 and bit box sub 230, selected to take up and generate the hammering effect caused by the throw of the cam surfaces. In the illustrated embodiment, for example, while the cam surfaces 270a, 270b create an axially reciprocating motion, the hammering effect generated by that motion occurs at the telescoping splined connection 222. The axially sliding motion that is created by the cam surfaces riding over one another causes the upper cam surface 270a, housing 218 and axial shaft 230 to be raised relative to bit box sub 214, as by axial movement between axial shaft 230 and bit box sub 214 at the telescoping splined connection 222. As the cam surfaces continue to ride over one another, the cam protrusions 274a, 274b (which may or may not include rollers) will drop off each other on their exit sides and this, in turn, causes upper cam surface 270a, housing 218 and axial shaft 230 to drop down. When this happens, end 230a of shaft 230 will strike against upper end 214a of bit box sub 214 (inside connection 222) creating a hammering effect that is conveyed to the bit in bit box 220. To ensure that the major striking force occurs at connection 222 between parts 214a and 230a, any operational gap between parts 214a, 230a, which is the maximum gap distance achieved when there is weight on bit driving sub 214 up into the housing and the cams have driven parts 214a, 230a apart, should be at least slightly less than the maximum, unrestricted throw of cam surfaces, which is the maximum unrestricted distance that could be traveled by upper cam surface 270a as its cam protrusions 274 or rollers drop off the cam protrusions or rollers on lower cam surface 270b. If the gap between parts 214a and 230a is more than the throw of the cam surfaces, the cam surfaces will strike each other before the axial shaft and bit box sub can come together. Although this will create a percussive effect, it does cause greater wear at the cam surfaces and requires the use of adequate thrust and radial bearings along the axial shaft. However, by selecting the gap distance between parts 214a, 230a to be less than the throw of the cam surfaces, the hammering is taken up and generated along the shaft, which maintains the force in line, concentrated around the center axis x of the tool and between more rugged parts. In such an embodiment, the cam surfaces also are protected from at least some wear, reducing their need for repair or replacement.

In one embodiment, the contact surfaces between parts, where the hammering effect is generated may be supplemented with percussion plates that have a greater wear resistance than the other materials of these parts. In one embodiment, seals or structures may be provided to facilitate fluid flow through bore 254 past the impact area between parts 214a, 230a. For example, in one embodiment, a sleeve/nipple may provided on one part 214a or 230a that inserts into an enlarged region of the bore formed on the other of the two parts and seals, such as o-rings may be provided therebetween to prevent fluid from passing from bore 254 into the impact region between the parts. The splined connection 222 may also provide a cushioning effect. As noted above, the clearances in the splined connection may be selected to cushion the movement of the parts when the gap is closing such that shock generation is controlled. In one embodiment, the clearances at the splined connection are selected to control the degree to which the axial movement is cushioned at the connection and such that a hammering effect is generated but the shock generation is controlled.

In the illustrated embodiment, first cam surface 270a is provided by a ring 275 installed in housing 218. Ring 275 forms surface 270a annularly with protrusions 274a downwardly facing. A bore 276 in the ring provides an opening through which a portion of shaft 230 (as illustrated) or bit box sub 214 extends. Second cam surface 270b, in the illustrated embodiment, is provided by a ring 277 that includes threads 278 for securing on an end of sub 214 such that surface 270b is facing upwardly to position its cam protrusions 274b for engagement against those on surface 270a.

Ring 275 and housing 218, at shoulder 218c, bear against each other such that movement, such as upward movement caused by interaction of the cam surfaces, is transferred to the housing. In addition, ring 275 and housing, at shoulder 230c, also may bear against each other such that upward movement caused by interaction of the cam surfaces is as well transferred to the shaft 230.

The embodiment of FIG. 4 operates to drill a borehole by applying a percussive force through the drill bit to the formation when weight is applied on bit. When the bit is lifted off bottom, the bit box sub 214 is able to drop into its lower position which separates the cam surfaces and discontinues the percussive force.

When weight on bit is resumed and axial shaft 230 is driven to rotate, cam surfaces 270a, 270b will be rotated at different speeds such that their cam surfaces will ride up over one another and drop off the exit side causing housing 218 and axial shaft to be lifted away from bit box sub 214, as that sub and the bit it carries remains on bottom, and, thereafter, as the cam protrusions exit off one another, the housing and the axial shaft drop down. When the housing and axial shaft 230 drop down, a hammering effect is applied to bit box sub, as by surface 230a striking surface 214a.

The embodiment above operates effectively by lifting an upper part of the drilling accelerator, the housing 218, relative to a lower portion, in that embodiment, the bit box sub 214, to separate the parts and once separated, allowing the upper part to drop down on the lower part to create a hammering effect. This creates a vibratory force on the lower part, but tends to avoid the creation of harmonics, lateral loads and other adverse effects. In the foregoing accelerator, the lifting and dropping of the parts is driven by the interaction of cam surfaces. In other embodiments, the lifting and dropping may be driven by other parts. For example, in one embodiment a valve and pressure chamber may be employed to drive the hammering effect. A valve may be employed that creates a seal against fluid flow at lower pressures, but which seal can be overcome by fluid pressures above a particular pressure. As such, the valve can work with fluid passing through the accelerator to cause fluid to build up in a chamber between the upper and lower portions of the accelerator, such fluid build up causing the upper portion to be lifted relative to the lower portion to create a gap between impact surfaces thereof and when the selected pressure is reached, the valve opens to allow the fluid to pass, thus releasing the pressure holding the parts apart and allowing the upper part to drop down on the lower part.

In one embodiment, a percussion adapter includes an upper housing, a fluid flow channel extending from the upper end to the lower end of the upper housing, a lower housing telescopically installed for axially sliding motion relative to the lower end of the upper housing, a second fluid flow channel extending from an inlet end open at the upper end to a discharge end opening at the lower end of the lower housing, the inlet end being in fluid communication with the outlet end of the first fluid flow channel, a valve to meter fluid passing from the first fluid flow channel through the second fluid flow channel to create a back pressure driving the upper housing longitudinally outwardly from the lower housing when the valve is closed and allowing the parts to come together when the valve is opened, the valve being opened by a fluid pressure when the pressure exceeds a set value and the valve being closed to create the back pressure when the pressure falls below the set value.

Figure 5:
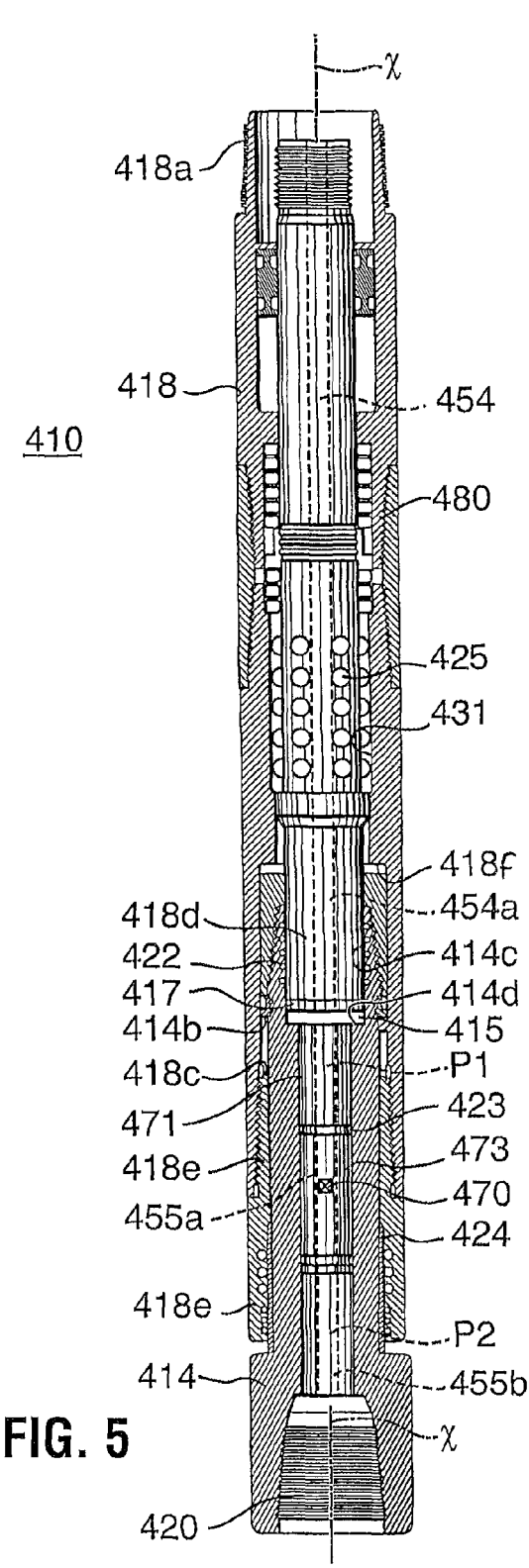
FIG. 5 is an axial sectional view along another drilling accelerator.

In one embodiment, for example, as shown in FIG. 5, another drilling accelerator 410 may include an upper housing 418 including an upper end 418a and a lower housing 414 including a lower end, in this embodiment shown as a bit box 420. Housing parts 418, 420 are rugged, being exposed on their external surfaces to the wellbore annulus. Lower housing 420 and upper housing 418 are telescopically connected such that lower housing 420 remains connected to the upper housing but can slide axially relative thereto.

To facilitate construction of the drilling accelerator, as will be appreciated, the housing can be formed in sections and connected together by various means such as by welding, interlocks or threaded connections 480.

Upper end 418a of the housing is formed for connection to a drill string. Bit box 420, in this illustrated embodiment, is threaded to accept connection, directly or indirectly, of a drill bit (not shown). In other embodiments, lower housing 414 may include other structures such as a liner connector, or a sub connection, rather than a bit box.

A fluid passage extends down through the drilling accelerator. The fluid passage includes a bore 454 (shown in phantom) through the upper housing, which opens at the upper end in communication with the fluid supply from above (from a motor discharge for example) and opens at a lower outlet end 454a, and a bore 455a, 455b (shown in phantom) that extends from the upper end of housing 414 to the bit box 420. As such, the fluid that is supplied during drilling can continue down through the upper housing and housing 414 toward the bit. Seals or structures may be provided to contain fluid in bores 454, 455a, 455b avoiding pressure leaks between the parts 418, 414.

Drilling accelerator 410 further includes a driver to impart an axial, reciprocating motion to apply a percussive force at any drill bit connected into the bit box during drilling.

In the illustrated embodiment, the driver acts to lift the upper housing telescopically away from the lower housing and thereafter allows the upper housing to drop down on the lower housing to impact it and create a hammering effect thereon. The dropping motion of the upper housing relative to the lower housing can be by gravity or weight on bit, while the lower housing remains restrained in the wellbore as by resting against bottom hole. In the illustrated embodiment, the hammering effect is generated at chamber 415, which is the gap that is opened up when the upper housing and the lower housing telescopically separate.

In this illustrated embodiment, the driver includes a valve 470 in fluid passage 455 that controls fluid flow through the passage depending on the pressure differential between pressure P1 in passages 455a, 454 and in chamber 415 uphole of the valve and pressure P2 downhole of the valve, in passage 455b. The valve, for example, may be of a pressure sensitive type that remains closed at lower pressures but opens when the pressure reaches a certain, higher overcoming pressure. Various valves are useful such as a poppet valve, a biased ball valve, etc. When valve 470 remains closed, it causes pressure P1 to build up in passages 455a, 454 uphole of the valve. This build up in pressure causes the upper housing and lower housing to be driven apart, to expand the volume of chamber 415, thus in normal operation, lifting upper housing away from the lower housing. This expansion of chamber 415 continues until the valve opens, after which the fluid is allowed to pass the valve and the pressure holding the parts 418, 414 apart is dissipated to close the gap between them.

The valve may be selected that any pressure dissipation is abrupt such that the upper housing can drop abruptly on to the lower housing. The sudden release of pressure from chamber 415 allows the upper housing to rapidly close the gap, such that the upper housing strikes against the lower housing, creating a hammering effect. The gap closing develops an abrupt, hammering vibration as the surfaces come together. When the pressure is released, valve 470 again closes and once again passages 454 and 455a and chamber 415 above the valve can begin to pressure up to drive the upper housing away from the lower housing. As such, the cycle to generate a subsequent hammering impact between the parts is again initiated.

The hammering effect is generated along the long axis x of the tool, which maintains the force in line, concentrated around the center axis x of the tool and between rugged parts. For example, the valve 270 can be spaced away from the point of impact such that it and/or the valve housing are isolated to some degree from the force generated.

The housings can take various forms. For example, in the illustrated embodiment, upper housing 418 includes three main parts a main body defining upper end 418a, a shaft 418d extending from the main body along long axis x and a sleeve 418e extending from the main body at the same end as the shaft. Sleeve 418a is spaced from shaft 418d, but extends substantially concentrically about and alongside it such as that an annular space is formed between the parts. In the illustrated embodiment, the upper end, the shaft and the sleeve are fixed together to move axially as one.

Considering the illustrated form of upper housing 418, lower housing 414 in the illustrated embodiment, includes a bore 414c extending into its upper end. Lower housing 414 is telescopically positioned in the annular space between sleeve 418e and shaft 418d with the shaft extending into bore 414c. Lower housing 414 is retained by interacting shoulders 418c, 414b from fully passing out of the end of sleeve 418e. A bushing 424 acts between housing 418 and housing 414 to reduce wear therebetween and provide a good base for seals.

As the lower housing moves telescopically relative to the upper housing, shaft 418d slides in bore 414c. In the illustrated embodiment, a shoulder 414d is formed in bore 414c at which the diameter of the bore is reduced. Shoulder 414d limits the advancement of shaft 418d into the bore. Chamber 415 is formed between the shaft and the shoulder and these parts form the surfaces at which the hammering effect is, at least in part, generated. The axial movement of upper housing relative to the lower housing causes chamber 415 to be opened and closed between shaft 418d and shoulder 414d of bore 414c. In particular, in one position, when shaft 418d is driven against shoulder 414d, chamber 415 is effectively non existent defining no volume and, in another position (as shown), shaft 418b is withdrawn from contact with the shoulder and chamber 415 has a volume.

In the illustrated embodiment, fluid passage 454 extends through shaft 418d. While the upper housing could be formed in other ways, in one embodiment, shaft 418d is formed by a mandrel that extends from or through (as shown) an axial bore 431 through the housing. In such an embodiment, fluid passage bore 454 extends through or alongside the mandrel. Likewise, the lower housing may be formed in various ways, for example, to facilitate installation of valve 470, a shaft 471 and insert body 473 accommodating valve 470 may be installed in bore 414c below the shoulder. In such an embodiment, fluid passage bore 455a extends through the shaft 471 to communicate to the valve and passage 455b extends through body 473 below the valve.

Seals 422, 423 or other structures may be provided to contain fluid in bores 454, 455, avoiding pressure leaks between the parts 418, 414.

In the illustrated embodiment, the valve acts to lift the upper housing including shaft 418*d* away from shoulder 414*d*. Once an opening pressure is reached across the valve, the valve opens and the shaft of the upper housing is driven by gravity or weight on bit against the shoulder in the bore to create the hammering effect on the lower housing.

Impacting surfaces of shaft 418*d* and shoulder 414*d* may be formed from materials that accommodate considerable wear without rapid break down. In one embodiment, the contact surfaces between parts, where the hammering effect is generated may be supplemented with percussion plates, such as plate 417, which have a greater wear resistance than the other materials of these parts.

While a hammering effect is described as being generated about chamber 415, hammering effects can be generated in addition or instead between other surfaces of the upper housing and the lower housing. For example, an external shoulder of lower housing can be contacted with an internal shoulder 418*f* of upper housing to create a hammering effect, the movement between the parts being generated by valve 470.

The embodiment of FIG. 5 operates to drill a borehole by applying a percussive force through the drill bit to the formation when weight is applied on bit. When the bit is lifted off bottom, the lower housing is able to drop into a lower position which separates the shaft from the end of the bore and substantially discontinues the percussive force, as it is mostly dissipated by shouldering of the lower housing. In particular, the valve may continue to cycle between an open and closed position, but the lower housing will already be shouldered, with 414*b* against 418*c*, at a fully extended position with cavity 415 at a maximum volume.

When weight on bit is resumed and fluid is driven into the flow passages of the tool, the valve will begin to cause a pressure fluctuation that causes a pressure build up to lift the upper housing away from the lower housing and then to open the valve, when a selected pressure is reached, such that the upper housing can drop down on the lower housing. When the upper housing drops down, a hammering effect is applied to lower housing as by shaft 418*d* striking surface 414*d*. The hammering effect is conveyed to the bit box.

As will be appreciated, to facilitate the drilling operation, any bit in bit box 420 may be rotated. In the embodiment, illustrated in FIG. 5, the accelerator is intended to be rotatably driven by rotation of the drill string. As such, the parts are secured as by splined connections 425 and by corresponding faceting of shaft 418*d* and bore 414*c* for movement as a single unit.

Figure 6:
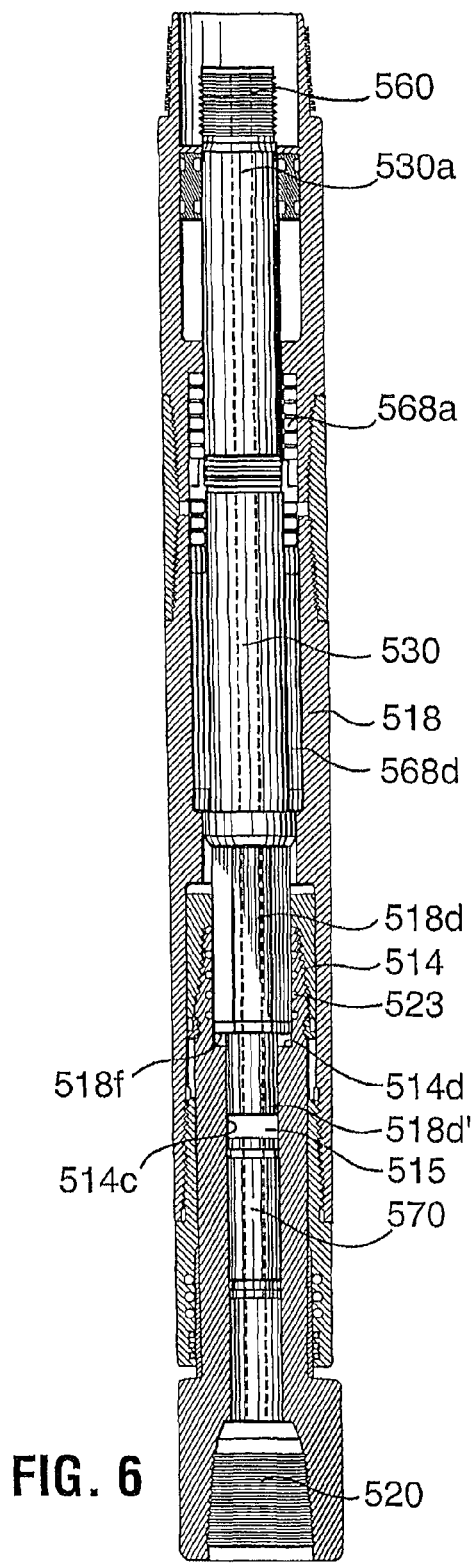
FIG. 6 is an axial sectional view along another drilling accelerator.

In the embodiment of FIG. 6, the percussive adapter operates by use of a valve 570 that is capable of creating a back pressure that lifts upper housing 518 away from lower housing 514 and thereafter opens to release the back pressure to allow the parts 514, 518 to come together creating a sudden hammering impact. This is similar to the operation of the tool of FIG. 5. However, unlike that of FIG. 5, mandrel 530 acts to transmit drive energy from an input end 530*a* thereof to lower housing 514 and, therethrough, to any drill bit installed in box 520. For example, lower housing 514 and mandrel 530 may be connected to transmit torque therethrough by a telescoping faceted connection 523 that ensures continuous rotational drive conveyance while permitting axial sliding motion of the lower housing relative to mandrel 530.

The input torque applied to end 530*a* may be generated by a mud motor. For example, mandrel 530 may be connected to a rotor of a mud motor such that any rotation of the rotor, as by flow of drilling fluid through the motor, may be conveyed to the bit box sub. In one embodiment, the mud motor may include a positive displacement-type motor (PDM), which uses pressure and flow of the drilling fluid to turn a rotor within a stator. The motor, in one embodiment, may include stator housing having a square cross sectional shape, to facilitate increased weight on bit with flexure in the motor housing. Mandrel 530 can be connected directly or indirectly to the rotor, as through threaded connection 560. Where a bent sub is positioned between the motor and the drilling accelerator, a universal connector may be positioned therebetween to convey rotation from the rotor to the axial shaft.

Bearings 568*a*, 568*d* and bushings may be positioned between the mandrel and the housing to accommodate radial and on bottom and off bottom thrust loads. A safety catch may also be provided between these parts.

Also, while the hammering effect is received at shoulder 514*d* of lower housing, the contacting surface of upper housing is a shoulder 518*f* of mandrel 530. Mandrel 518*d* includes a nipple end 518*d'* that extends beyond shoulder 514*d* into bore 514*c* and pressure chamber 515 is axially distanced from the parts 514*d*, 518*f* at which the hammering effect is generated. As such, the possibility of drilling fluid contamination of the shoulders. The distance between the upper housing (shaft) and the lower housing (valve housing) at chamber 515 is greater than between shoulders 514*d*, 518*f* so that the hammering effect does not occur adjacent the valve and the valve is protected from impact damage.

While the foregoing describes the operation of various drilling accelerators with a drill bit in a bit box sub, it is to be appreciated that the percussion adapters, rather than creating a vibratory effect on a bit, may of course be employed as agitators to apply a vibratory force to other downhole structures. For example, a percussion adapter can be used as an agitator in a drill string for example spaced apart along the drill string to create uphole vibration in the string. Such vibration may reduce drag. In such an embodiment, the bit box may be replaced with a drilling tubular connector. In another embodiment, the percussive adapter may be secured above a liner to apply a vibratory effect to thereby facilitate installation thereof. In such an embodiment, the bit box may be replaced with a liner connector, such as a releasable liner hanger. The percussive adapter may be secured above the liner and may be operated to vibrate the liner into a selected position in the hole. Thereafter, the connector may be operated to position the liner in the hole, if desired, and the percussive adapter may be removed therefrom and tripped to surface.

A percussive adapter according to an embodiment, generates a vibratory effect that facilitates drilling or other downhole operations but appears to avoid the generation of problematic harmonics and shocks. It is believed that the lower frequency operation, short stroke length and cushioned movements may offer a more controllable, less harsh environment, when compared to previous drilling hammers. For example, the fluid cushion provided at the splined connection, such as connection 222 in FIG. 4, and in particular the speed at which the lubricating fluid can move past the spline components when they are moving, may control the speed at which the parts can come together. Alternately or in addition, the operation of the hammer of FIG. 4 tends not to create mud pressure fluctuations, which may tend to avoid interferences. As such, while it may not have previously been thought to be possible with drilling hammers, the present adapter can be employed with various downhole devices such as non-percussive drill bits, shock subs, survey tools and/or rotary steerable devices.

For example, while drilling hammers have often been employed with percussive, non-standard drill bits, in one embodiment, the present hammer may be operated with a standard bit, such as a tricone or PDC (polycrystalline diamond compact) bit. In one embodiment, for example, a PDC or tricone bit may be employed that is useful for steerable operations.

Thus, in one embodiment, the present percussive adapters may be employed to drill in vertical holes, as well as in non-vertical holes such as horizontal, deviated, lateral, and/or tangential boreholes and, in fact, through build angles.

In one embodiment, the present percussive adapters, for example one according to FIG. 4, tends to operate without interference with survey tool instrumentation which is normally sensitive to physical abuse. As such, tools with sensitive mechanical, electromechanical and/or electronic components such as MWD, LWD, EM, pulse, gyroscope, monel and/or UBHO tools may be employed in a bottomhole assembly with the percussive adapter. These tools may also be employed with the percussive adapters of FIG. 5 or 6, if mud flow rate and pressure fluctuations can be tolerated. Again, this permits the use of the tool in non-vertical boreholes.

In another embodiment, the present percussive adapters, for example, those of FIG. 4, 5 or 6, tend to operate without interference of tools offering steerability. For example, the percussive adapters may be employed with a rotary steerable tool. For example, the percussive adapter of one of the foregoing embodiments of FIG. 4, 5, or 6 may be employed with a rotary steerable tool that includes a biasing member that biases the string to the high side of the hole to direct the drill bit in that direction. Such a rotary steerable tool may permit the string to be rotated while the tool remains set in a biasing position. Such tools may be employed in a bottom hole assembly with the percussive adapter. As such, again, this permits the use of the tool to form non-vertical boreholes.

In another embodiment, a shock sub may be employed in a bottom hole assembly with the percussion adapter. A shock sub provides protection against bottom hole assembly damage from vibrational shock. The shock sub may be installed above the percussion adapter at least at and possibly higher than the neutral point considering weight on bit requirements. The neutral point considers the point at which the string transitions from compression to tension. The position of the shock sub may depend on the weight on bit required for operation of the bit and to drive the upper housing to drop down onto the lower housing and the weight on bit afforded by the BHA below which the shock sub is positioned. For lighter weight on bit requirements, it may be useful to install the shock sub closer, for example, directly above the percussive adapter. However, if the drilling operation is to proceed with high weights on bit (>15,000 Decs), then the shock sub may be positioned higher up to reach the neutral point. If a shock sub is employed with survey tools, it may be useful to position the shock sub between the survey tools and the percussive adapter. However, as noted above, the present percussive adapter may not, in any event, interfere with the sensitive components of the survey tools.

FIG. 7 show various possible strings and bottom hole assemblies employing the percussion adapter of the present invention.

Figure 7A:
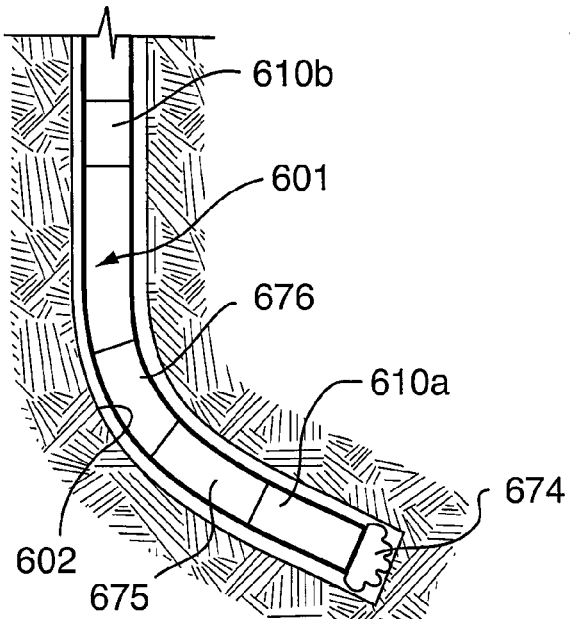
FIGS. 7A to 7D are schematic illustrations of various bottom hole assemblies.

The string 601 of FIG. 7A, for example includes a bottom hole assembly including drilling accelerator 610a adjacent a pdc (polycrystalline diamond compact) bit 674. The bit and accelerator are driven by a motor 675 to drill a borehole 602 through a build angle, as monitored by a survey tool 676. The string includes a second drilling accelerator 610b positioned uphole of the bottom hole assembly, which acts to input vibrational energy to the drill string to counteract drag.

Figure 7B:
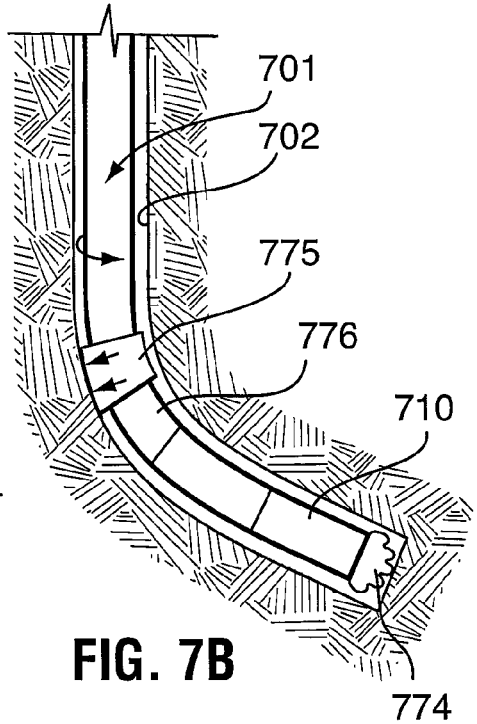

The string 701 of FIG. 7B, for example, includes a bottom hole assembly including a drilling accelerator 710 adjacent a bit 774, which may for example be of the tricone or pdc types. The bit and accelerator are driven from surface, as by string rotation, to drill a borehole 702 through a build angle, as driven by a rotary steerable tool 775 and monitored by a measuring-while-drilling tool 776.

Figure 7C:
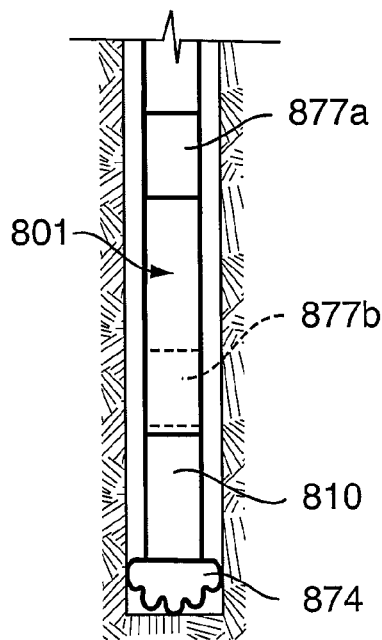

The string 801 of FIG. 7C, for example includes a bottom hole assembly including a drilling accelerator 810 adjacent a bit 874. A shock sub 877a is positioned along the string to absorb and limit transmission of the percussive forces generated by the drilling accelerator, as well a other normal shocks associated with drilling along the string. Depending on the neutral point of the string, as described above, the shock sub could be moved closer to the drilling accelerator, as shown in phantom at 877b.

Figure 7D:
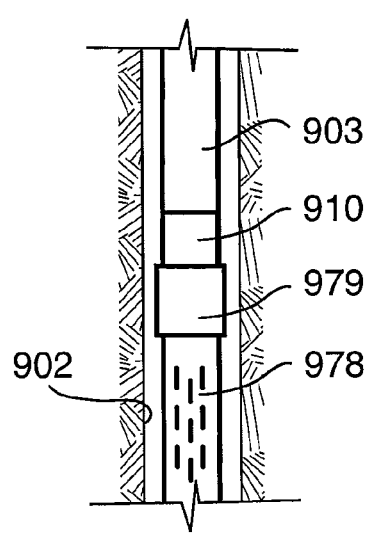

The string of FIG. 7D, is for placement of a liner 978, rather than for drilling per se. The string includes an upper work string 903 for supporting the liner and manipulating it from surface, a liner hanger 979 for securing the liner in the wellbore 902 once it is in position and a percussive adapter 910 for imparting a vibratory energy to the liner to facilitate its installation into the well. For example, the percussive adapter may apply a percussive effect to the liner to counteract drag.

The use of a percussive adapter to apply a percussive, axially directed reciprocation to a drill bit may generate left hand torque in the drill string. Such torque may adversely effect standard threaded connections along the string, such as connections 280, causing them to become loosened or to unthread completely. As such, with reference to FIG. 8, a threaded connection can be used at connection 280 or in connections in other string components that can accommodate left hand torque substantially without weakening the connection. In one embodiment, such a connection includes a collar 380 including a pair of threaded box ends 382, 384. Box end 382 includes a thread form extending in a direction opposite from the thread form of box end 384. For example, if box end 382 includes a left hand thread, box end 384 includes a right hand thread. As will be appreciated by persons skilled in the art of wellbore tubular strings, a collar is the term used to describe a substantially cylindrical connector that is formed to accept threaded engagement of a pair of tubulars, each with a threaded pin end. The box ends each have thread forms that start adjacent the collar end face 382a, 384a, respectively, and extend fully or partially toward a crest 385. Crest 385 may be threaded or smooth, depending on the type of collar.

The illustrated connection further includes a first wellbore tubular 386 and a second wellbore tubular 388, each formed with a pin end 386a, 388a, respectively. Tubulars 386, 388 can by housing sections of a drilling accelerator, mud motor, or other tubular portions of a down hole assembly or drill string. Each pin end has a pin end face 386b, 388b, respectively. The pin ends each include a thread form selected to thread into their respective box end 382 or 384. Pin ends 386a, 388a further have corresponding stepped regions formed by axial extensions from their pin end faces such that the pin ends can engage each other to restrict or possibly eliminate relative rotational movement therebetween about their long axis χt, when they are held end face adjacent to end face in collar 380. The stepped regions are formed by varying the pin end's length from its pin base to its end face, creating an axially extending stepped area along the pin end face. For example, one pin end face 386b includes a stepped extension where the face has a length change creating a shoulder 389a while the other pin end face 388b includes a stepped recess along its circumference also creating a shoulder 389b, the stepped recess is formed to correspond to and, for example, follow in the reverse, the stepped extension of the first pin end such that the two shoulders can be seated against each other, preventing the two pin ends from rotating relative to each other. To most effectively prevent relative rotation between the pin ends, the stepped regions may be formed of abrupt length changes creating sharper corners, rather than being curved undulations that could ride over each other. Also, to allow the pin ends to mesh, as by being advanced towards each other along their long axis, it will be appreciated that the stepped regions may form the shoulders along a line substantially aligned with the tubular's long axis.

It will be appreciated that such shoulders formed by stepped regions and recesses, form at least one tooth 390a, 390b extending from each pin end face 386b, 388b, each formed so that the pin end faces can mesh and be prevented from rotating relative to each other.

The shoulders may be positioned to resist the relative rotation that is adverse to the threaded condition of the connection. For example, in one embodiment, the shoulders may be positioned to provide resistance to back off by left hand torque. Alternately, each pin end face may include at least one left hand facing shoulder and at least one right hand facing shoulder such that the tubulars are substantially prevented from rotating in either direction relative to each other. In the illustrated embodiment, the tubulars each include a plurality of left and right hand facing shoulders forming, in effect, a plurality of teeth with gaps g therebetween. The teeth on the first wellbore tubular are formed to mesh closely between the teeth on the second wellbore tubular. In particular, the teeth 390a of the first tubular are formed to fit tightly between the teeth 390b on the second tubular such that, if the pins are brought together, end to end, the teeth 390a fit into the gaps between teeth 390b with the sides 390a' of teeth 390a positioned closely alongside the sides 390b' of teeth 390b. In this position, engagement between the shoulders 389a, 389b formed by the sides of the teeth prevents rotation of one pin end relative to the other, when they are held pin end to pin end in the collar.

Forces tending to urge the pin ends to rotate about their long axis to unthread from the connection are resisted by contact between the shoulders of the pin ends. As such, it is useful to provide a reasonable surface area for contact between the shoulders of opposite pin ends. In one embodiment, for example, corresponding shoulders may have sides 390a', 390b' that are cut substantially radially, in other words substantially along a radial line extending out from the center axis of the tubular.

Pin end faces and shoulders may have close tolerances. If some flex is desired at the connection, such that the lateral rigidity at the connection is reduced, tolerances may be relaxed between pin end faces, such that the length of the shoulder extension on one tubular does not quite equal the depth of the shoulder on the opposite tubular. In other words, the length L of the teeth, measured from tip 392 to base 393 (FIG. 8C) on one tubular is more than the length of the teeth on the other tubular. The gap formed between the tips of one tubulars teeth and the bases of the other tubulars teeth allows some lateral flex at the connection. Another option to provide for more lateral deflection at the connection, in addition or alternately to the foregoing, may be to indent the outer surface of the teeth. This reduces the thickness t (FIG. 8C) of the pin end along the length of the teeth and may create a space between the tooth and the inner surface of the collar, when the pin is threaded into the collar. The surface indentation can be initiated at a tapering surface 391 adjacent the base 393 of the teeth to provide more landing space for lateral deflection.

The type of thread form, including for example, taper and pitch, used in the connection is not particularly important. In one embodiment, a modified Acme thread may be used to enhance seating and to deter fluid migration through the threaded interfaces at the connection, but other thread forms may be used, as desired.

Seals may be provided in the connection, such as for example o-rings 395 in the collar at the crest and/or at interfacing surfaces, for example surfaces 394a, 394b with close tolerances, to enhance the fluid sealing properties of the collar.

To make up the connection, the first and second wellbore tubulars are aligned to be threaded into their respective box ends of the collar and also, the tubulars are aligned with their teeth offset so that the teeth of each tubular are aligned to mesh into the openings between the teeth of the other tubular. In this way, the stepped regions formed by the teeth on one tubular may be set against the shoulders formed by the teeth on the other tubular. With the teeth alignment preserved, the first and second wellbore tubulars are then brought into a position such that their threads can be engaged by the threads of the collar and the collar is rotated about its long axis to engage the tubular pin ends and draw the pin ends into the collar. As the tubulars are drawn in by the collar, the teeth become meshed at the thread crest.

Once threaded together, the interlock provided by the intermeshed teeth act against, and may prevent completely, back off in the connection even where there is considerable left hand torque. In addition, torque tends not to be transferred through the threads of the connection. Also, by allowing some tolerance between the pin end faces, the connection can allow for lateral flexing, such that the connection may not become too stiff.

When using the connection, it may be useful to position the right hand threaded pin end on the uphole end of the connection. Generally in wellbore operations, torque input from surface is most often to the right. As such, placing the right hand threaded pin end on the upper end of the connection ensures that even if the connection itself binds down hole, the string will in its normal rotation continue to drive the pin end into the connection, rather than backing off. That being said, it is believed that such a condition would be rare. It is believed that with the pin to pin locking provided by the teeth, the only way the torque won't transition through the connection is if the collar completely binds down hole such that it cannot rotate, while the tubulars both have opposite torque applied thereto sufficient to overcome the interlock of the teeth.

Left hand torque is common and often problematic in mud motor applications such as the current motor driven drilling hammer. However, the connection may also be useful for other applications where left hand torque tends to act adversely on tubular connections such as in subs adjacent any rotationally driven drill bit.

To release the connection, the collar is reverse rotated about the connection's axis $\chi t$, again while the tubulars are held stationary.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

I claim:

1. A method for accelerating the drilling penetration of a rotary driven drill bit, the method comprising:
    coupling a drilling accelerator to a rotor of a positive displacement motor the rotor being rotatable and the drilling accelerator including:
        a housing,
        a shaft coupled to the rotor and rotatable by the rotor,
        a bit box sub moveable relative to the housing, and
        a cam assembly having a first cam surface coupled to the housing and a second cam surface coupled to the bit box sub, wherein the first cam surface and the second cam surface are moveable relative to each other between a first configuration and a second configuration; and
    delivering fluid through the motor to rotate the rotor and the shaft, thereby moving the cam assembly from the first configuration to the second configuration, thereby lifting the shaft and the housing away from the bit box sub; and
    continuing to deliver fluid through the motor to rotate the rotor and the shaft, thereby moving the cam assembly from the second configuration to the first configuration, thereby enabling at least one of (a) the shaft impacting the bit box sub and (b) the first cam surface impacting the second cam surface, the impacting generating axial percussive force;
        wherein the shaft impacting the bit box sub generates the axial percussive force;
        wherein during impacting, the first cam surface is spaced from impact with the second cam surface.

2. The method of claim 1 further comprising stopping the generation of axial percussive force by eliminating weight on bit.

3. The method of claim 1 further comprising rotating the drill bit by rotation of a drill string to which the drilling accelerator is connected.

4. The method of claim 1 further comprising rotating the drill bit by conveying rotational drive through the shaft and the bit box sub to the drill bit.

5. The method of claim 1 further comprising providing a threaded connection to accommodate left hand torque in the housing, the threaded connection including a collar including an upwardly facing box formed to accept a right hand thread form and a downwardly facing box formed to accept a left hand thread form.

6. The method of claim 1 further comprising communicating the axial percussive force from the drilling accelerator to the drill bit.

7. The method of claim 1 further comprising rotating the drill bit by conveying rotational drive through the shaft and the bit box sub to the drill bit.

8. The method of claim 1, wherein rotating the shaft, rotates the second cam surface relative to the first cam surface to move the cam assembly between the first configuration and the second configuration.

9. A drilling accelerator comprising:
    a housing;
    a rotatable shaft;
    a bit box sub moveable relative to the housing; and
    a cam assembly having a first cam surface coupled to the housing and a second cam surface coupled to the bit box sub, wherein the first cam surface and the second cam surface are moveable relative to each other between a first configuration and a second configuration; and
    rotation of the rotatable shaft moving the cam assembly from the first configuration to the second configuration, thereby lifting the rotatable shaft and the housing away from the bit box sub; and continued rotation of the rotatable shaft moving the cam assembly from the second configuration to the first configuration, thereby enabling at least one of (a) the shaft impacting the bit box sub and (b) the first cam surface impacting the second cam surface, the impacting generating axial percussive force in the drilling accelerator;
    wherein the rotatable shaft impacting the bit box sub generates the axial percussive force;
    wherein when the rotatable shaft impacts the bit box sub, the first cam surface is spaced from impact with the second cam surface.

10. The drilling accelerator of claim 9 further comprising a connection between the rotatable shaft and the bit box sub, the connection communicating rotational drive from the rotatable shaft to the bit box sub and allowing axial movement of the bit box sub relative to the rotatable shaft between an impacting position and a position forming a gap between a lower surface of the rotatable shaft and an upper surface of the bit box sub.

11. The drilling accelerator of claim 9 further comprising a threaded connection to accommodate left hand torque in the housing, the threaded connection including a collar including an upwardly facing box formed to accept a right hand thread form and a downwardly facing box formed to accept a left hand thread form.

12. A drilling accelerator comprising:
    a housing;
    a rotatable shaft;
    a bit box sub moveable relative to the housing; and
    a cam assembly having a first cam surface coupled to the housing and a second cam surface coupled to the bit box sub, wherein the first cam surface and the second cam surface are moveable relatives to each other between a first configuration and a second configuration; and
    rotation of the rotatable shat moving the cam assembly from the first configuration to the second configuration, thereby lifting the rotatable shaft and the housing away from the bit box sub; and continued rotation of the rotatable shaft moving the cam assembly from the second configuration to the first configuration, thereby enabling at least one of (a) the shaft impacting the bit box sub and (b) the first earn surface impacting the second earn surface, the impacting generating axial percussive force in the drilling accelerator;
    wherein the bit box sub is axially moveable in the housing between a compressed position with the first cam surface and the second cam surface in contact and an intension position where the second cam surface is spaced from the first surface and the cam assembly is unable to move between the first configuration and the second configuration.

\* \* \* \* \*